United States Patent [19]
Dudinec et al.

[11] 3,785,491
[45] Jan. 15, 1974

[54] FILTER ANTI-DRAINBACK AND RELIEF VALVES

[75] Inventors: Emery Dudinec, Colonia; John R. Wilhelm, Perth Amboy, both of N.J.

[73] Assignee: Purolator, Inc., Rahway, N.J.

[22] Filed: Oct. 28, 1971

[21] Appl. No.: 193,477

[52] U.S. Cl. .......... 210/130, 210/DIG. 17, 210/136, 210/443
[51] Int. Cl. ............................................. B01d 27/10
[58] Field of Search .................... 210/130, 136, 430, 210/433, DIG. 17, 443, 133

[56] References Cited
UNITED STATES PATENTS

| | | | |
|---|---|---|---|
| 3,332,554 | 7/1967 | Humbert, Jr. | 210/DIG. 17 |
| 3,529,722 | 9/1970 | Humbert, Jr. | 210/443 |
| 3,640,390 | 2/1972 | Gay et al. | 210/130 |
| 2,734,636 | 2/1956 | Foster | 210/DIG. 17 |
| 2,731,154 | 1/1956 | Burnell | 210/DIG. 17 |

FOREIGN PATENTS OR APPLICATIONS

| | | | |
|---|---|---|---|
| 1,351,293 | 3/1963 | France | 210/DIG. 17 |

Primary Examiner—Samih N. Zaharna
Assistant Examiner—T. A. Granger
Attorney—Charles B. Spencer

[57] ABSTRACT

A single molded rubber element provides both the relief valve and the anti-drainback valve in an automotive-type oil filter.

3 Claims, 3 Drawing Figures

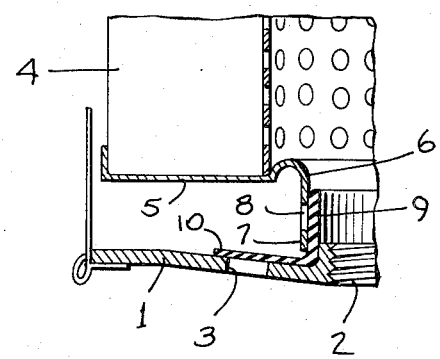
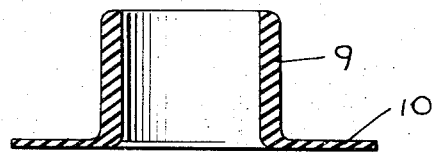
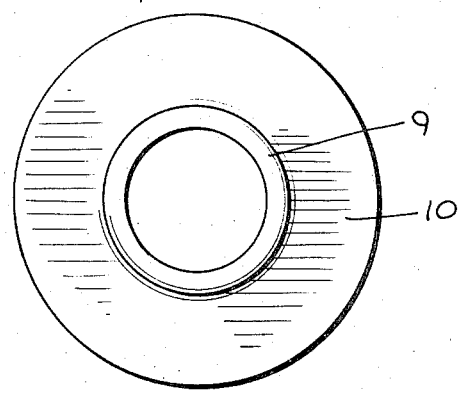

FILTER ANTI-DRAINBACK AND RELIEF VALVES

This invention relates to automobile oil filters of the spin-on design, an example being shown by the Casaleggi U.S. Pat. No. 3,490,597 dated Jan. 20, 1970.

Such a filter has an anti-drainback valve to prevent the oil from draining from the filter casing backwards through the inlet ports of the filter. It also has a relief valve for providing a bypass for the oil when the filter element in the filter, through extended use, retards the oil flow enough to produce an excessive pressure differential. These two valves have heretofore been separate elements adding substantially to the manufacturing cost of the filter.

One object of the present invention is to reduce this manufacturing cost.

A spin-on filter, as exemplified by the Casaleggi patent, has a cover plate having a central internally extending tubular outlet annularly surrounded by a plurality of inlet ports formed through the plate. The outlet is internally threaded so it can be spun on the threaded stud of the filter mounting pad on an automobile engine, an annular gasket mounted by the cover plate surrounding the inlet ports and seating on the seat of the engine pad, the latter introducing oil to the filter between the gasket and the outlet, the oil flow returning to the engine through the latter. A filter element inside of the casing has an end cap forming a tubular conduit having an end portion encircling the outlet and, in the Casaleggi patent, engaging the latter to position the lower end of the filter element.

To briefly summarize the present invention, the above referred to filter element end cap is modified by the provision of a series of relief ports formed through it adjacent to the outlet. An elastically deformable rubber molding forms a collar having a portion positioned between the conduit's end portion and the outlet, the conduit being appropriately sized relative to the outlet to permit this, this collar extending from the conduit upwardly and covering the relief ports. In addition, the molding integrally forms a skirt extending radially from the collar below the conduit and covering the inlet ports. The conduit and the lower portions of the collar and inlet are press fitted together so that the conduit and, therefore, the cover plate and the adjacent end of the filter element itself are held in position.

In operation the skirt functions as the anti-drainback valve in the usual fashion. The collar forms the relief valve with its opening pressure differential determined by the wall thickness of the collar. Under a thus predetermined pressure differential, the collar deflects inwardly with the oil flowing into the filter casing by way of the inlet ports, then having direct access to the outlet through the relief ports.

In the above manner the single rubber molding performs the functions of both the relief valve and the anti-drainback valve of the filter. Obviously the manufacturing cost of the filter is reduced.

A specific example of the invention is illustrated by the accompanying drawings in which:

FIG. 1 is a longitudinal section of only the lower half portion of the filter;

FIG. 2 is a longitudinal section of the rubber molding; and

FIG. 3 is a top view of the molding.

Referring to these drawings, although FIG. 1 shows only the lower half portion of the filter in section, it is to be understood that the filter includes the parts shown by the previously mentioned Casaleggi patent, or their equivalent, excepting, of course, that the relief valve of this patent is eliminated and the top end cap, not shown by the present drawings, should completely close the entire top end of the filter.

With the above understanding, FIG. 1 shows the cover plate 1 having the internally or upwardly extending outlet 2, appropriately internally threaded and surrounded by the annular series of inlet ports 3 formed through the cover plate. The filter element 4 has the end cap 5 forming a tubular conduit 6 having an end portion 7 encircling the outlet 2. To this extent the construction of the Casaleggi patent is used.

However, in accordance with the present invention, the conduit 6 above its lower portion 7 has a series of relief ports 8 formed radially through it.

The rubber molding is shown by FIGS. 2 and 3 as having the collar 9 and the skirt 10, the wall thickness of the collar 9 being substantially thicker than that of the skirt 10. Reference again to FIG. 1 shows that the collar 9 is positioned between the conduit 6 and the outer periphery of the outlet 2 with the conduit's lower portion 7 pressing the collar against the outlet 2 by the parts being press-fitted together. Although modified, essentially the same parts shown by the Casaleggi patent mount the rubber molding in position.

In operation, the skirt 10 functions as the anti-drainback valve in the same fashion as in the Casaleggi patent construction. When the element 4 has been in extended use, the pressure in the filter casing above the cover plate 1 becomes excessively high, the pressure in the conduit 6 through which the filter oil exits becoming correspondingly lower. Depending on the thickness of the collar 9, the latter can inwardly deform elastically so that the oil can bypass directly from the inlet ports 3 through the relief ports 8 and out through the outlet 2. Assuming that the skirt 10 has a wall thickness comparable to the prior art anti-drainback valve, and is made of the same type of elestically deformable material, the collar 9 should have a substantially greater wall thickness to resist deformation below the relief pressure required by the overall filter design and use. The exact wall thickness required for relief at any desired pressure differential may be either calculated or determined experimentally.

As previously indicated, the molding of FIGS. 2 and 3 may be made by practically any rubber molding technique, the result, of course, being an integral unit. The term "rubber" as used herein is intended to cover not only the natural and synthetic rubbers, but any material capable of withstanding hot oil and which can be molded or otherwise comparably formed to provide the required elastic deformability.

What is claimed is:

1. A fluid filter assembly for use with a housing and comprising a cover plate for said housing and having an outside for association with a filter mounting pad and a central internally extending tubular fluid outlet that is internally threaded for attachment to said pad and projects inwardly from the inside of the plate, said plate having formed through it a circular series of inlet ports surrounding said tubular outlet, a filter element with an end cap having an outside spaced opposite to the inside of said plate and a central tubular conduit projecting from its outside towards the inside of the plate, said conduit being longer than said outlet, the end portion of said conduit being telescoped partially over said outlet but leaving a length of the conduit free therefrom and extending to said end cap, said length having a circumferential series of fluid pressure relief ports formed through it, and an elastically deformable rubber molding forming a tubular collar having a length superimposed inside of the conduit's said length and normally covering said relief ports substantially fluid-tightly while being elastically displaceable radially inwardly by excessive fluid pressure on the outside of said tubular conduit applied to said collar through said relief ports, said tubular collar having an end portion interposed between the telescoped portions of said tubular conduit and tubular outlet, said portions being press fitted together so that said collar is held in position with said conduit held through said collar's end portion by said tubular outlet and therefore holding said end cap in position.

2. The filter of claim 1 in which said molding also forms a skirt extending from between the end of said conduit and the inside of said cover plate, said skirt extending radially from the end of the collar's said end portion and overlapping said circular series of inlet ports formed through said cover plate in a substantially fluid-tight manner but being displaceable therefrom by inlet fluid pressure on the outside of said cover plate when applied to said skirt through said inlet ports, said collar and said skirt being integral with each other.

3. The filter of claim 2 in which said molding's collar has a greater wall thickness than said molding's skirt so that a greater fluid pressure is required to displace the molding's collar than is required to displace the molding's skirt.

* * * * *